(12) United States Patent
Horie

(10) Patent No.: US 7,332,022 B2
(45) Date of Patent: Feb. 19, 2008

(54) INK SET FOR IMAGE RECORDING APPARATUS

(75) Inventor: Kaoru Horie, Hachioji (JP)

(73) Assignee: Olympus Corporation, Tokyo (JP)

( * ) Notice: Subject to any disclaimer, the term of this patent is extended or adjusted under 35 U.S.C. 154(b) by 501 days.

(21) Appl. No.: 10/892,571

(22) Filed: Jul. 14, 2004

(65) Prior Publication Data

US 2004/0255809 A1 Dec. 23, 2004

Related U.S. Application Data

(63) Continuation of application No. PCT/JP03/00541, filed on Jan. 22, 2003.

(30) Foreign Application Priority Data

Jan. 22, 2002 (JP) ............... 2002-013405

(51) Int. Cl.
C09D 11/02 (2006.01)

(52) U.S. Cl. ................... 106/31.27; 106/31.6

(58) Field of Classification Search ............ 106/31.27, 106/31.6

See application file for complete search history.

(56) References Cited

U.S. PATENT DOCUMENTS 6,075,069 A * 6/2000 Takemoto ............ 523/160
6,379,441 B1 * 4/2002 Kanaya et al. ......... 106/31.49
6,454,844 B1 9/2002 Kanaya
6,482,256 B1 11/2002 Kanaya et al.
6,670,409 B2 * 12/2003 Yatake .................. 523/160
6,924,327 B2 * 8/2005 Sano et al. ............. 523/160
2002/0007762 A1 1/2002 Arakawa
2002/0038613 A1 4/2002 Yatake
2002/0060727 A1 5/2002 Nishita

FOREIGN PATENT DOCUMENTS

| EP | 0985716 A | * | 3/2000 |
| EP | 1 043 370 A1 | | 10/2000 |
| EP | 1 048 705 A1 | | 11/2000 |
| EP | 1 136 530 A2 | | 9/2001 |
| EP | 1 148 103 A1 | | 10/2001 |
| EP | 1 193 078 A2 | | 4/2002 |
| JP | 2001-179956 A | | 7/2001 |
| JP | 2002-256190 A | | 9/2002 |
| WO | WO 02/16513 A1 | | 2/2002 |

* cited by examiner

*Primary Examiner*—J. A. Lorengo
*Assistant Examiner*—Veronica Faison-Gee
(74) *Attorney, Agent, or Firm*—Frishauf, Holtz, Goodman & Chick, P.C.

(57) ABSTRACT

An ink set for an image recording apparatus, includes a first ink, and a second ink which has the same color base as that of the first ink but is different from the first ink in density. A coloring material having a color base different from that of the first ink is mixed in the second ink in such a manner that a hue thereof approximates a hue of the first ink.

11 Claims, 2 Drawing Sheets

INK SET FOR IMAGE RECORDING APPARATUS

CROSS-REFERENCE TO RELATED APPLICATIONS

This is a Continuation Application of PCT Application No. PCT/JP03/00541, filed Jan. 22, 2003, which was not published under PCT Article 21(2) in English.

This application is based upon and claims the benefit of priority from prior Japanese Patent Application No. 2002-013405, filed Jan. 22, 2002, the entire contents of which are incorporated herein by reference.

BACKGROUND OF THE INVENTION

1. Field of the Invention

The present invention relates to an ink set for an image recording apparatus, which comprises a plurality of inks which are used to record images with respect to a recording medium.

2. Description of the Related Art

Various kinds of image recording apparatuses are known. In recent years, an ink jet printer adopting an ink jet recording mode has been extensively used since it is relatively inexpensive and small in size. Such an ink jet printer discharges ink droplets toward a recording medium, thereby recording an image on the recording medium.

For an ink jet printer, there have been adopted various recording methods in order to change in lightness of colors to be recorded. As one recording method, the number of dots per unit area of ink dots spotted on a recording medium is increased or decreased. When a gray scale is recorded based on this recording method, a part with a low gradation level is recorded with a low printing percentage, and a part with a high gradation level is recorded with a high printing percentage. Therefore, when recording of a part with a low gradation level is attempted by using an ink with a high density, a recorded image has a grainy appearance.

It is to be noted that the term "printing percentage" means the number of ink dots per unit area recorded on a recording medium. For example, when an image is recorded with a resolution of 360 dpi, recording all ink dots in 360-by-360 lattice points arranged in one square inch means a printing percentage 100%.

As another conventional recording method for disappearing the grainy appearance of the ink dots into the shade, there is a recording method using inks with different densities. In this method, there is used an ink set for an image recording apparatus, which has a plurality of types of inks. This ink set for an image recording apparatus comprises a normal ink with a high density and a light ink with a density lower than that of the normal ink, in accordance with each color.

Incidentally, in this specification, when using a plurality of inks at the time of recording one color, a given ink is determined as a first ink, and an ink with a density different from that of the first ink is determined as a second ink. Therefore, in the ink set for an image recording apparatus, the normal ink is determined as the first ink, and the light ink is determined as the second ink.

When recording a 256-gradation gray scale by using these inks, an ink jet printer records a part with a high gradation level by mainly using the normal ink, records a part with a low gradation level by mainly using the light ink, and records a part with an intermediate gradation level by using both the normal ink and the light ink. As a result, the ink jet printer represents the change in lightness of the gray scale. More particularly, when recording a gray scale from a low gradation, only the light ink is used at the beginning as shown in FIG. 4. At this moment, the printing percentage is gradually increased as the gradation level is increased. When the printing percentage of the light ink becomes 100%, the printing percentage of the light ink starts to be decreased, and the printing percentage of the normal ink starts to be increased in turn. It is to be noted that, in the recording, the gradation level becomes maximum when the printing percentage of the normal ink becomes 100%. That is, the gradation level when the printing percentage of the normal ink becomes 100% is 255.

As described above, in the method, a timing to start printing using the normal ink (first ink) is when the printing percentage of the light ink (second ink) starts to be decreased after reaching a predetermined quantity. Based on the above, the start timing is when the printing percentage of the light ink starts to be decreased after the printing percentage reaches 100%. That is, printing using the normal ink starts immediately after the printing percentage of the light ink reaches 100%.

It is to be noted that, in the case of recording a gray scale, the gradation level when the first ink starts to be used is referred to as the "printing start level" in this specification. In other words, the term "printing start level" means a timing (gradation level) with which printing using the first ink starts when the printing percentage of the second ink starts to be decreased in the case of recording a gray scale by using two inks with different densities. Therefore, when there is a description "the printing start level is set to the gradation level (128)", this means that the gradation level at the time of the start timing is 128. It is to be noted that this example means printing using the normal ink starts at the gradation level (128).

In the gray scale recorded by using the ink set for an image recording apparatus, since a part with a low gradation level is recorded by using the light ink as described above, the ink shade appears grainy.

In the ink set for an image recording apparatus using the above-described method, the light ink is generally produced by diluting the normal ink having a high density by using a solvent. In the thus manufactured light ink, its hue is changed because of the solvent. As a result, at the printing start level, the hue of the normal ink recorded on the recording medium largely differs from the hue of the light ink.

In more detail, when recording the gray scale in such a manner that the gradation level is gradually increased, printing using the light ink as well as printing using the normal ink starts at the printing start level. That is, at the gradation level higher than this printing start level, the gray scale is formed of ink dots of two inks having different hues.

Therefore, in the gray scale, color skipping becomes distinctive with the printing start level at a boundary. The term "color skipping" means that an observer feels a difference in lightness as well as a difference in hue when comparing close gradation areas with different color lightness even though the gray scale is represented by using one color.

Color skipping becomes distinctive with the printing start level at the boundary because the hue suddenly varies with the printing start level at the boundary. That is, when the conventional ink set for an image recording apparatus is used, the gray scale is constituted by using both the first and second inks having different hues. As a result, the hues of the inks greatly differ with the printing start level at the boundary, and hence color skipping occurs.

The ink set for an image recording apparatus by which the color skipping becomes distinctive in the gray scale is hard to record a natural image with the high quality.

BRIEF SUMMARY OF THE INVENTION

According to an aspect of the invention, an ink set for an image recording apparatus comprises a first ink, and a second ink which has the same color base as that of the first ink but is different from the first ink in density. In the ink set for an image recording apparatus, a coloring material having a color base different from that of the first ink is mixed in the second ink in such a manner that a hue thereof approximates a hue of the first ink.

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will now be described hereinafter with reference to the accompanying drawings.

First, an ink set for an image recording apparatus according to one embodiment of the present invention will be described. The ink set for an image recording apparatus according to this embodiment has inks which are used to record respective colors, i.e., cyan, magenta, yellow and black. The ink set for an image recording apparatus comprises an ink with a relatively high density in accordance with each color. Moreover, the ink set for an image recording apparatus comprises a correction light ink with a density lower than those of the normal inks of cyan and magenta.

The correction light ink is an ink produced by adding a coloring material to a light ink obtained by diluting the normal ink in this embodiment. A hue of the correction light ink is adjusted by using the coloring material to match or approximate a hue of the normal ink. The light ink in a conventional ink set for an image recording apparatus is obtained by diluting the normal ink by using a solvent, as described above. Therefore, in the conventional ink set for an image recording apparatus, a hue of the normal ink is different from a hue of the light ink. In regard to this point, the correction light ink according to this embodiment is different from the conventional light ink. The correction light ink will be described in detail hereinafter.

It is to be noted that the normal ink is determined as a first ink and the correction light ink is determined as a second ink when explaining the ink set for an image recording apparatus according to this embodiment. It is to be noted that an ink (diluted ink) obtained by simply diluting the normal ink is simply referred to as a light ink, like the prior art.

Figure 1:
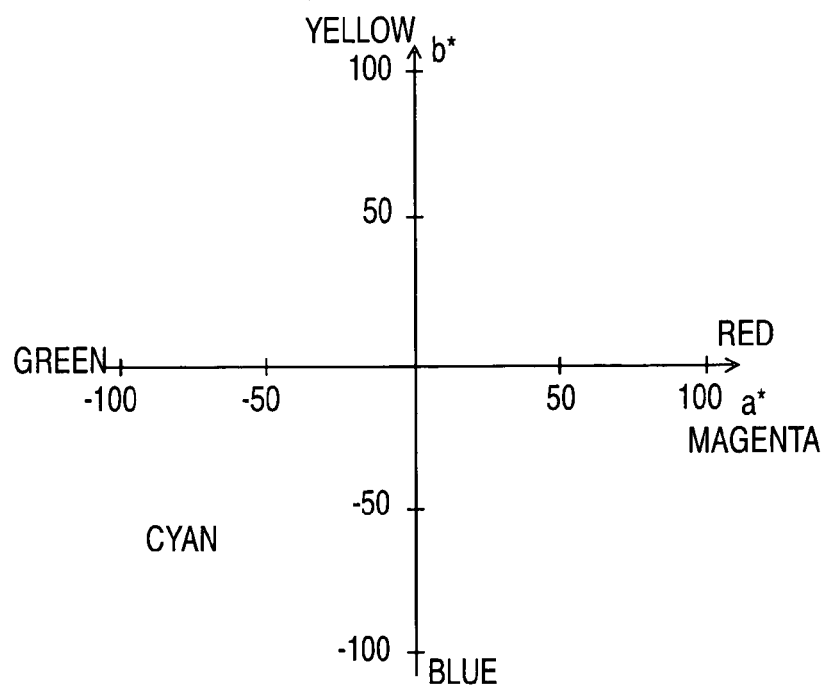
FIG. 1 is a view showing an a*b* coordinate of a CIE1976 (L*a*b*) color system.

Incidentally, the hue is measured as follows in this embodiment. However, the method for measuring the hue is not restricted to the following method. In this embodiment, the hues of the normal ink, the correction light ink, the light ink and the coloring material are measured by using a CIE1976 (L*a*b*) color system in a D65 light source. Specifically, the hue of each ink is plotted in such an a*b* coordinate as shown in FIG. 1 and examined. It is to be noted that L* indicates a brightness of a color in the (L*a*b*) color system.

Moreover, in this embodiment, a printing start level when printing a gray scale is set to a gradation level (128). Additionally, the start timing in this embodiment is set to 100%, like the prior art. It is to be noted that the printing start level and the start timing can be arbitrarily changed in accordance with a recording method of an image recording apparatus.

As a sample for measuring the hue, there is used a recorded image obtained by each of the normal ink, the light ink and the correction light recorded at the printing start level. This is used in order to adjust the hue of the correction light ink based on the measurement result. Adjusting the hue by using the sample under the above-described condition is preferable for matching or approximating the hue of the correction light ink to the hue of the normal ink at the printing start level.

In more detail, the hue of each of the light ink and the correction light ink when printed at a printing percentage 100% is checked. As to the normal ink, the hue at the gradation level (128) when the 0-gradation to 255-gradation gray scale is recorded is checked while solely changing the printing percentage.

Figure 2:
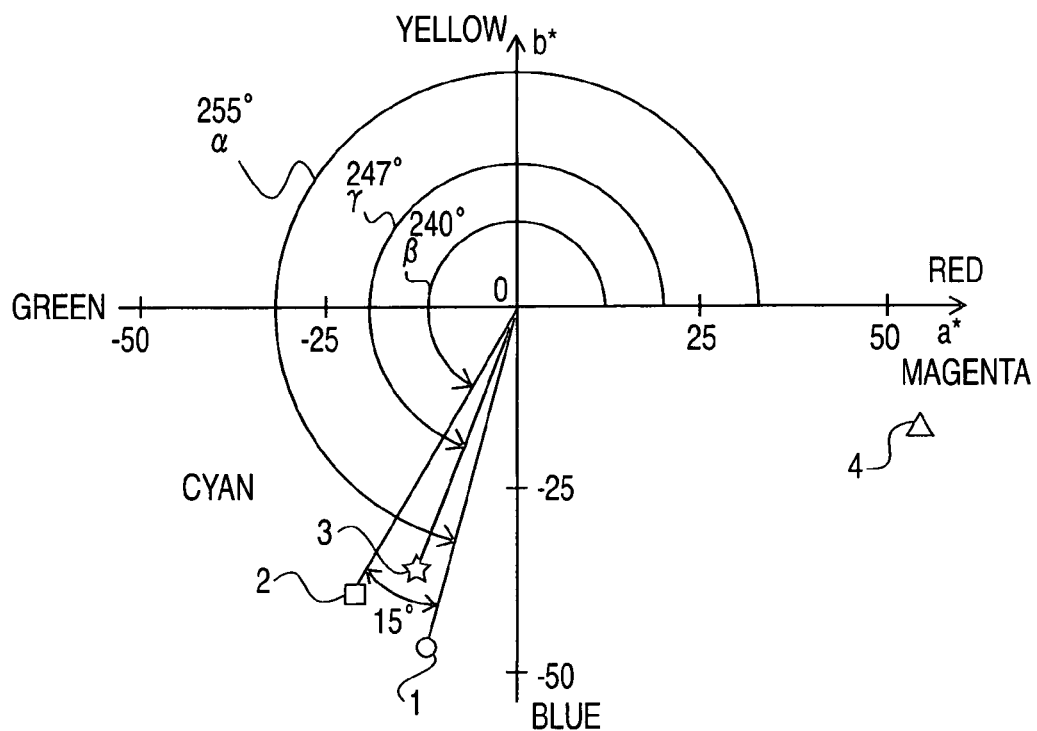
FIG. 2 is a view schematically showing a hue of each of a normal ink, a light ink, a correction light ink and a coloring material, all of which are plotted in an a*b* coordinate, in one embodiment of the present invention.

When the cyan base normal ink and light ink are plotted in the L*a*b* space, a result is as shown in FIG. 2. The hue of each color is represented by a hue angle in the a*b* coordinate. The hue angle will now be described concretely with reference to FIG. 2.

In FIG. 2, reference numeral 1 denotes a point obtained by plotting the hue of an image (image representing the gradation level (128)) using the normal ink. Further, reference numeral 2 designates a point obtained by plotting the hue of an image (image representing the gradation level (128)) using the light ink.

The hue angle is indicated by a coordinate (0, 0) in the a*b* coordinate system, a straight line connecting the plotted points, and an angle in the counterclockwise direction from an a* plus axis. In this embodiment, the normal ink of cyan (see the point 1) has a hue angle of approximately 255° indicated by an angle α. Furthermore, the light ink (see the point 2) has a hue angle of approximately 240° indicated by an angle β.

A difference in hue between these inks can be obtained from a difference in hue angle. In this embodiment, the two inks have a hue angle difference of approximately 15°.

An observer starts to sense color skipping in the case of comparing areas of two colors having different lightness in one gray scale when a hue angle difference between these areas is greater than a predetermined value. The inventors of the present invention have derived that the possibility of recognizing color skipping becomes high when the hue angle difference is larger than approximately ±8°. Therefore, the value at which color skipping is seen is approximately ±8°.

It is to be noted that the hue angle difference between the normal ink and the light ink is approximately 15°. Therefore, when the gray scale is recorded by using these inks, the color skipping becomes distinctive in the vicinity of the printing start level of the normal ink.

The correction light ink is produced by adding the coloring material to the light ink in such a manner that the hue angle difference from the normal ink falls within a range of approximately ±8°, which is a predetermined value. In other words, the light ink becomes a correction light ink whose hue is close to that of the normal ink when the coloring material is added thereto. It is to be noted that the hue angle difference between the normal ink and the correction light ink is not restricted as long as it is set to fall within a range in which color skipping is not recognized, but it is preferably set to approximately ±8° or below or, most preferably, approximately 0°.

This coloring material is selected as described below in order to adjust the hue of the correction light ink as mentioned above. A coloring material selection method will now be described with reference to FIG. 2.

Although the light ink of cyan (see the point 2) has a hue angle of approximately 240° as indicated by the angle β, it is smaller than the hue angle of the normal ink of cyan (see the point 1) by approximately 15°. In other words, the hue angle of the normal ink is larger than that of the light ink by approximately 15° in the counterclockwise direction. Therefore, the coloring material is selected in such a manner that the hue angle difference of the correction light ink which is approximately 15° can be reduced to fall within the range of approximately ±8°.

More specifically, there is selected a coloring material having a hue angle which approaches the hue angle of the normal ink from the hue angle of the light ink. Therefore, in this embodiment, the coloring material is selected from those having a hue angle on the counterclockwise direction side away from the hue angel of the normal ink. For example, as the coloring material to be added to the cyan base light ink in FIG. 2, a magenta base coloring material denoted by reference numeral 4 is selected.

Now, a case in which the correction light ink is created by using the coloring material 4 will be described. When the coloring material 4 was added to the light ink, the correction light ink having a hue angle indicated by a point 3 was produced. The hue angle γ of this correction light ink is 247°, and its difference fell within a range of ±8° as compared with the hue angle of the normal ink. Therefore, the coloring material selected by the above-described selection method is suitable for producing the correction light ink according to this embodiment.

Now, a case, in which the gray scale is recorded by using the ink set for an image recording apparatus comprising this correction light ink of cyan (correction light cyan ink) and the normal ink of cyan (normal cyan ink), will be described.

In the gray scale formed by this recording, the color skipping is not distinctive even in the vicinity of the printing start level, and the lightness smoothly varies. Therefore, the ink set for an image recording apparatus according to this embodiment can form a smooth gray scale without color skipping. Accordingly, the ink set for an image recording apparatus according to this embodiment can record a natural image with high quality.

Figure 3:
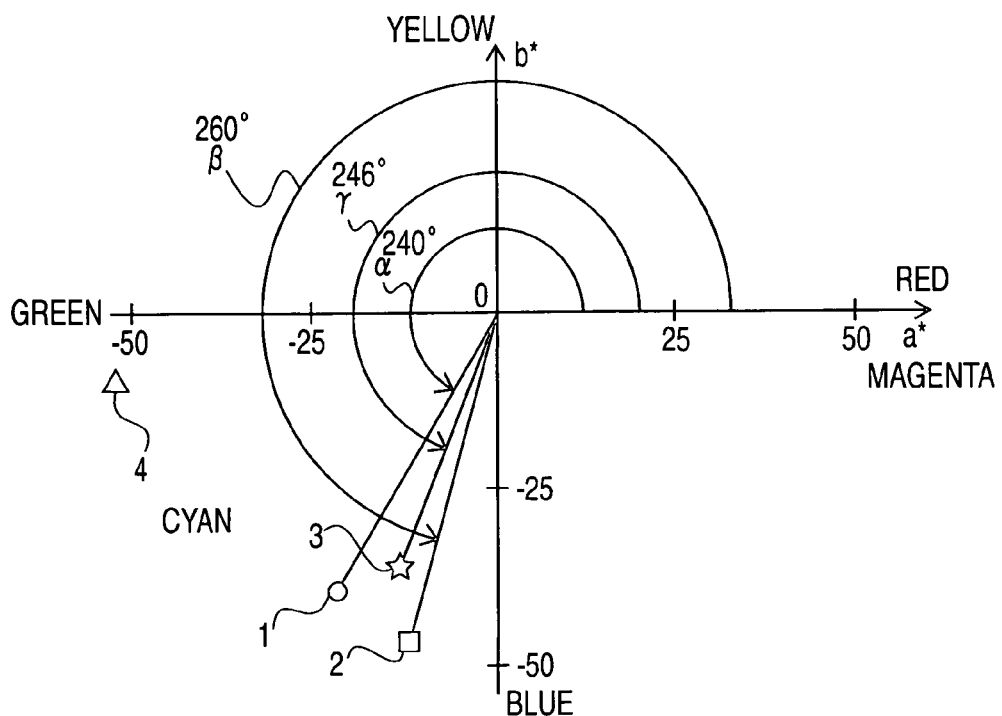
FIG. 3 is a view schematically showing a hue of each of a normal ink, a light ink, a correction light ink and a color material, all of which are plotted in an a*b* coordinate, in another embodiment of the present invention.
Figure 4:
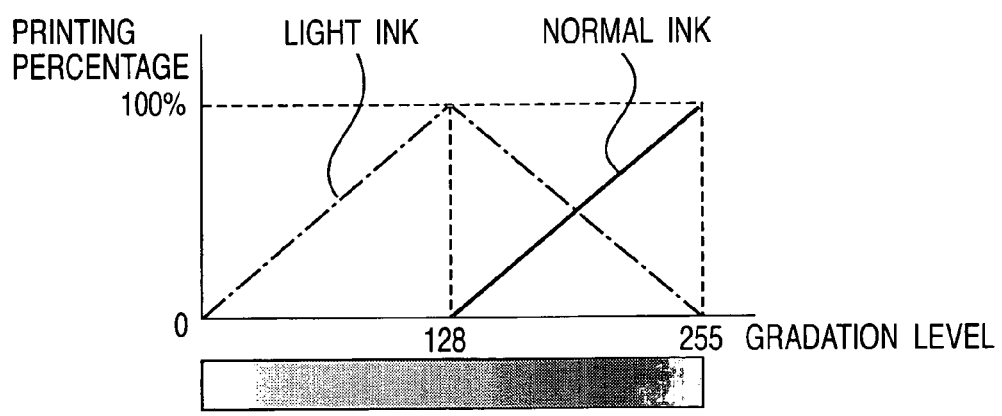
FIG. 4 is a view showing a relationship between a gradation level and a printing percentage of each ink when recording a 256-gradation gray scale by using the correction light ink or the light ink and the normal ink.

It is to be noted that there is a case in which the hue angle of the light ink is positioned on the counterclockwise direction side away from that of the normal ink. FIG. 3 shows an ink set for an image recording apparatus in such a case as another embodiment. In FIG. 3, a point 2 indicative of a hue of the light ink of cyan (light cyan ink) is plotted, and a point 1 indicative of a hue of the normal ink of cyan is plotted.

A hue angle of the light cyan ink is approximately 260°, and a hue angle of the normal ink of cyan is approximately 240°. In this case, as the coloring material 4, a green base coloring material or a yellow base coloring material having a hue angle on the clockwise direction side away from that of the normal ink is selected. The selected coloring material 4 is added to the light cyan ink, and the correction light ink of cyan (correction light cyan ink) is created. The hue angle γ of the correction light ink is adjusted to 246° by the hue adjustment using the coloring material. As a result, the hue angle difference between the correction light ink and the normal ink is set within a predetermined value.

Even if the hue angle of the light ink exists on the counterclockwise direction side away from that of the normal ink in this manner, the correction light cyan ink 3 can be produced in such a manner that a relative hue angle difference with respect to the normal cyan ink can be set within a predetermined value (approximately ±8°).

There has conventionally been an image recording method which corrects a hue by discharging inks having different color bases and performing printing in order to avoid color skipping. For example, according to this conventional method, yellow or magenta is recorded with respect to the part of the gradation level at which color skipping is distinctive when the gray scale is recorded by using normal ink and light ink. In this method, however, the number of ink dots to be spotted per unit area of a recording medium is excessively large. As a result, an ink absorption allowable amount per unit area of the recording medium may be possibly exceeded. When the ink absorption capacity is exceeded, problems such as blurring and undried ink occur. Further, the above-described method has another inconvenience in that the quantity of ink used is increased.

On the contrary, in the ink set for an image recording apparatus according to this embodiment, the hues of the normal ink and the correction light ink are already corrected when each ink is set in the image recording apparatus. Therefore, the ink set for an image recording apparatus according to this embodiment does not have the above-described inconveniences. Accordingly, the ink set for an image recording apparatus according to this embodiment can record an image without bearing heavily upon an ink absorption capacity of a recording medium.

It is to be noted that the coloring material to be mixed in the light ink is selected in such a manner that a hue of the correction light ink approximates a hue of the normal ink in the above description. However, the present invention is not restricted thereto. A coloring material to be mixed in the normal ink can be selected in such a manner that a hue of the normal ink approximates a hue of the light ink. In other words, the ink set for an image recording apparatus can be constituted with the light ink being determined as the first ink and the ink obtained by mixing the coloring material in the normal ink being determined as the second ink.

Incidentally, in case of finding out a type of a coloring material mixed into the light ink from the state of the correction light ink, the type can be found out by adopting, e.g., an FT-IR (Fourier transform infrared spectroscopy) analysis method. That is, whether a coloring material having a different color base is included in the second ink can be detected by analyzing the first ink and the second ink in the ink set based on the FT-IR analysis method. Incidentally, when a hue angle difference between the first ink and the second ink falls within the predetermined quantity and the coloring material having a different color base is detected, it is determined that the coloring material having a different color base contributes to adjustment of the hue angle of the correction light ink.

It is to be noted that the solvent in this embodiment is not restricted by type, but a non-aqueous solvent having a boiling point not less than approximately 180° C. is preferred.

Furthermore, in the ink set for an image recording apparatus according to this embodiment, the correction light ink is produced by diluting the normal ink by using the solvent. However, in the ink set for an image recording apparatus according to this embodiment, the correction light ink can be produced from a material different from the normal ink, and it is not restricted to materials.

EXAMPLE 1

An example 1 according to the embodiment will now be described. In this example, a description will be given as to an example of using inks called Colorgrafx Supplies X2 Ink, manufactured by Xerox Engineering Systems, and a recording medium called Colorgrafx X2 Paper, Presentation 360, manufactured by the same company.

The ink set for an image recording apparatus according to this example is constituted of six colors, i.e., cyan, light cyan, magenta, light magenta, yellow and black. Cyan base and magenta base inks include normal inks (a cyan ink (26R678), a magenta ink (26R679)) as first inks, and light inks (a light cyan ink (26R681), a light magenta ink (26R682)). Each light ink has a density lower than that of the normal ink of the same color.

It is to be noted that the light cyan ink (26R681) is a so-called light ink of cyan (diluted ink) produced by diluting the cyan ink (26R678) by using a solvent. Likewise, the light magenta ink (26R681) is a so-called light ink of magenta (diluted ink) produced by diluting the magenta ink (26R679) by using a solvent.

As the solvent, a non-aqueous solvent having a boiling point which is not less than 188° C. is used.

Table 1 shows a hue angle of each of the cyan ink (26R678), the light cyan ink (26R681), the magenta ink (26R679) and the light cyan ink (26R681) at a gradation level at a printing start level.

TABLE 1

| Color | Gradation level | Hue angle (°) |
| --- | --- | --- |
| Cyan | 205 | 254 |
| Light cyan | 205 | 242 |
| Magenta | 166 | 356 |
| Light magenta | 166 | 342 |

In this example, a description will be given as to a case of an ink jet printer in which the cyan ink starts to be used when the gradation level reaches 205 gradations in the case of recording a gray scale of cyan having 256 gradations, i.e., the gradation level at the printing start level of the cyan ink is set to 205.

As shown in Table 1, a hue angle of the cyan ink at the gradation level 205 is 254°, and a hue angle of the light cyan ink at the same gradation level is 242°. That is, there is a hue angle difference of 12° between the both inks. Applying these values to the a*b* coordinate (see FIG. 1), the light cyan has the hue on the clockwise direction side as compared with the cyan ink. When the gray scale of cyan was recorded by using the two inks having such lightnesses, color skipping was confirmed in the vicinity of the gradation level 205.

In order to disappear such color skipping into the shade, the light magenta ink (26R682), which is a magenta base coloring material, is mixed in the light cyan ink at a predetermined rate in such a manner that the hue of the light cyan ink (26R681) approximates the hue of the cyan ink (26R678). That is, a correction light cyan ink, which is a correction light ink whose hue matches or approximates that of the normal ink, is produced by using the light cyan ink (26R681) and the coloring material. In this example, the correction light cyan ink is a second ink. Here, the light ink is used in place of the normal ink because adjustment of the hue angles can be facilitated. That is, even if a mixing rate of the coloring material is the same, the light ink has a smaller angle at which the hue angle varies than that of the normal ink.

The hue angle of the light magenta ink (26R682) is approximately 342°. When this ink is mixed in the light cyan ink (26R681), a hue angle of the mixed light cyan ink rotates in the counterclockwise direction. That is, the hue of the correction light cyan ink is approximated to the hue of the cyan ink.

It is to be noted that, in the above-described mixing, the light cyan ink was mixed with the light magenta ink at the rates of 10:1, 10:2, 10:3, 10:4 and 10:5 in order to produce the correction light ink of cyan (correction light cyan ink). Table 2 shows hue angles of the correction light cyan ink and hue angle differences of the same from hue angles of the cyan inks after mixing at the above-described rates.

TABLE 2

| Light cyan:Light magenta | Hue angle (°) | Hue angle difference from cyan ink (°) |
| --- | --- | --- |
| 10:0 | 242 | 12 |
| 10:1 | 254 | 0 |
| 10:2 | 262 | −8 |
| 10:3 | 271 | −17 |
| 10:4 | 276 | −22 |
| 10:5 | 279 | −25 |

As shown in Table 2, in the case of the correction light cyan ink based on the mixing rates of 10:1 and 10:2, the hue angle differences from the cyan ink fall within a range of ±8°. Therefore, the correction light cyan ink is produced by mixing the light cyan ink and the light magenta ink at these rates.

Incidentally, when the gray scale of cyan was recorded by using the cyan ink and the correction light cyan ink produced by mixing the light cyan ink with the light magenta ink at the rate of 10:1, color skipping was not recognized in the gray scale, and the gray scale was smoothly formed without a grainy appearance.

Moreover, in the case of recording using the correction light cyan ink described in conjunction with this example, the light magenta ink does not have to be used for hue correction when recording the gray scale of cyan. Therefore, the amount of inks consumed can be suppressed.

Additionally, the correction light cyan ink is produced with the ink obtained by diluting the normal cyan ink with the solvent as a base. Therefore, another cyan ink does not have to be prepared in order to manufacture the correction light ink. Therefore, the manufacturing cost can be suppressed. However, the correction light cyan ink is not restricted to the one mentioned above, and it may be produced from a cyan ink different from the above-described normal ink of cyan.

EXAMPLE 2

An ink set for an image recording apparatus of the example 2 according to the embodiment will now be described hereinafter. It is to be noted that, in this example 2, reference numerals denoting the constituent members equal to those of the ink set for an image recording apparatus according to the example 1 are used to designate the same constituent members as those of the ink set for an image recording apparatus according to the example 1, thereby eliminating a detailed explanation.

In this example, a description will be given as to an example of using inks called Colorgrafx Supplies X2 Ink, manufactured by Xerox Engineering Systems, and a recording medium called Colorgrafx X2 Paper, Presentation 360, manufactured by the same company, as in example 1.

In this example, in the case of recording a gray scale of magenta having 256 gradations, a magenta ink (normal ink) starts to be used when a gradation level reaches 166 gradations. That is, a description will be given on an example of an ink jet printer in which a printing start level of the magenta ink is set to 166. In this example, the magenta ink is determined as a first ink.

As shown in Table 1, a hue angle of the magenta ink at the gradation level 166 is 356°, and a hue angle of a light magenta ink at the same gradation level is 342°. That is, there is a hue angle difference of 14° between the both inks. Applying the both figures to the a*b* coordinate (see FIG. 1), the light magenta ink has a hue on the clockwise direction side as compared with the magenta ink. When the gray scale of magenta was recorded by using the inks having such different lightnesses, color skipping was confirmed in the vicinity of the gradation level 166.

In order to put such color skipping into the shade, a yellow ink (26R680) was mixed in the light magenta ink at a predetermined rate in such a manner that the hue of the light magenta ink (26R682) approximates the hue of the magenta ink (26R679) at the gradation level 166. That is, the light magenta ink (26R682) and a coloring material are used to produce a correction light magenta ink which is a correction light ink whose hue matches or approximates a hue of the normal ink. In this example, the correction light magenta ink is a second ink.

A hue angle of the yellow ink (26R680) is approximately 97°. That is, when this ink is mixed in the light magenta ink (26R682), the hue angle of the mixed light magenta ink rotates in the counterclockwise direction. As a result, the correction light magenta ink has a hue approximating the hue of the magenta ink.

Incidentally, in the above-described mixing, in order to produce the correction light magenta ink, the light magenta ink and the yellow ink were mixed at ratios of 200:0, 200:2, 200:4, 200:6, 200:8 and 200:10. Table 3 shows hue angles of the correction light magenta ink and hue angle differences of the same from the magenta ink after respective mixings.

TABLE 3

| Light magenta:yellow | Hue angle (°) | Hue angle difference from magenta ink |
|---|---|---|
| 200:0 | 342 | 14 |
| 200:2 | 346 | 10 |
| 200:4 | 350 | 6 |
| 200:6 | 354 | 2 |
| 200:8 | 358 | −2 |
| 200:10 | 361 | −5 |

As shown in Table 3, in regard to the correction light magenta ink having mixing ratios of light magenta ink and yellow ink at 200:4 and 200:10, the hue angle differences from the magenta ink falls within a range of ±8°. The correction light magenta ink is produced by mixing the light magenta ink and the yellow ink at these ratios.

Color skipping was not recognized in the gray scale of magenta recorded by using the magenta ink and the correction light magenta produced by mixing at the ratio of 200:8, and the gray scale was smoothly formed without a grainy appearance.

In the above, some embodiments are described concretely with reference to the accompanying drawings, but the present invention is not restricted to the above-described embodiments, and it includes all embodiments which can be carried out without departing from the scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ink set for an image recording apparatus, comprising:
   a first ink; and
   a second ink which has a same color base as a color base of the first ink and which has a density and a hue angle that are different from a density and a hue angle of the first ink,
   wherein a coloring material which has a color base that is different from the color base of the first ink is mixed in the second ink in such a manner that the hue angle of the second ink approximates the hue angle of the first ink.

2. The ink set for an image recording apparatus according to claim 1, wherein the density of the second ink is lower than the density of the first ink.

3. The ink set for an image recording apparatus according to claim 2, wherein the second ink is obtained by diluting the first ink and by mixing the coloring material which has the color base that is different from the color base of the first ink into the diluted first ink in such a manner that the hue angle of the second ink approximates the hue angle of the first ink.

4. The ink set for an image recording apparatus according to claim 1, wherein the hue angle of the first ink and the hue angle of the second ink fall within a range of approximately ±8°.

5. The ink set for an image recording apparatus according to claim 1, wherein the coloring material is mixed in the second ink in such a manner that a hue angle of an image that is based on the first ink and that represents a gradation level at which the first ink starts to be used approximates a hue angle of an image that is based on the second ink and that also represents the gradation level at which the first ink starts to be used.

6. An ink set for an image recording apparatus, comprising:
   a magenta based normal ink;
   a magenta based light ink which has a density that is lower than a density of the magenta based normal ink, and which has a hue angle that is different from a hue angle of the magenta based normal ink;
   a cyan based normal ink;
   a cyan based light ink which has a density that is lower than a density of the cyan based normal ink, which has a hue angle that is different from a hue angle of the cyan based normal ink, and into which a magenta based coloring material is mixed in such a manner that the hue angle of the cyan based light ink approximates the hue angle of the cyan based normal ink.

7. The ink set for an image recording apparatus according to claim 6, wherein the magenta based coloring material is the magenta based light ink.

8. The ink set for an image recording apparatus according to claim 6, wherein the magenta based coloring material is mixed into the cyan based light ink in such a manner that the hue angle of the cyan based light ink and the hue angle of the cyan based normal ink fall within a range of approximately ±8°.

9. An ink set for an image recording apparatus, comprising:
   a yellow ink;
   a magenta based normal ink;
   a magenta based light ink which has a density that is lower than a density of the magenta based normal ink, which has a hue angle that is different from a hue angle of the magenta based normal ink, and into which a yellow based coloring material is mixed in such a manner that the hue angle of the magenta based light ink approximates the hue angle of the magenta based normal ink.

10. The ink set for an image recording apparatus according to claim 9, wherein the yellow based coloring material is the yellow ink.

11. The ink set for an image recording apparatus according to claim 9, wherein the yellow based coloring material is mixed into the magenta based light ink in such a manner that the hue angle of the magenta based light ink and the hue angle of the magenta based normal ink fall within a range of approximately ±8°.

* * * * *